Figure 1:
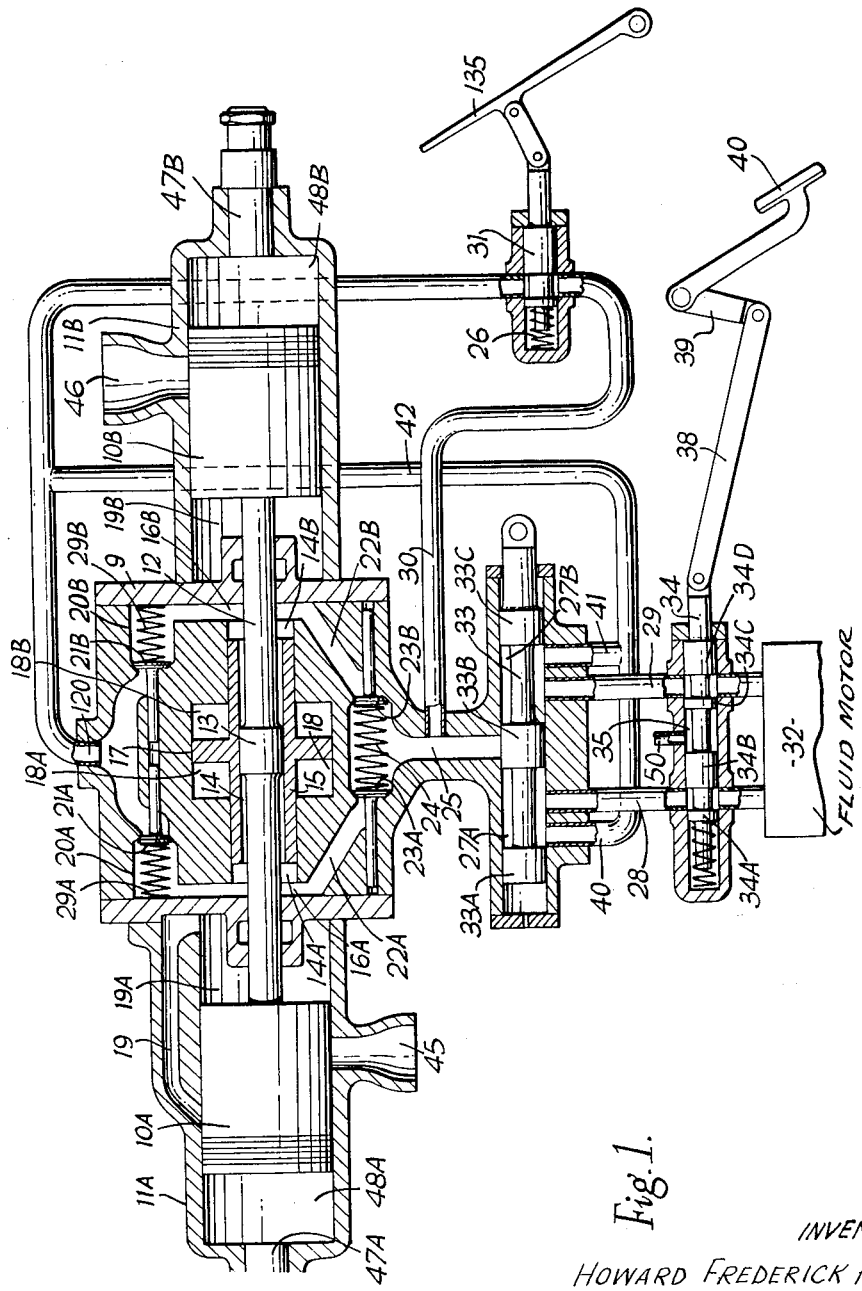

INVENTOR
HOWARD FREDERICK HOBBS
BY
Irwin S. Thompson
ATTORNEY

May 14, 1963  H. F. HOBBS  3,089,305
INTERNAL COMBUSTION ENGINES AND POWER TRANSMISSION THEREFOR
Filed Aug. 12, 1959  2 Sheets-Sheet 2

INVENTOR
HOWARD FREDERICK HOBBS
BY
Irwin S. Thompson
ATTORNEY

United States Patent Office 3,089,305
Patented May 14, 1963

3,089,305
INTERNAL COMBUSTION ENGINES AND POWER TRANSMISSION THEREFOR
Howard Frederick Hobbs, Leamington Spa, England, assignor to Hobbs Transmission Limited, Leamington Spa, England, a British company
Filed Aug. 12, 1959, Ser. No. 833,169
Claims priority, application Great Britain Aug. 21, 1958
9 Claims. (Cl. 60—19)

This invention relates to internal combustion engines and power transmission apparatus therefor and is particularly applicable to vehicles, but may be used for other purposes. It has for its main objects, simplification and saving in weight and cost, and improvement in efficiency. A further object is to provide an improved transmission apparatus whereby the torque or force developed by the engine is converted in an infinitely and automatically variable manner to suit the demands on an output part.

The transmission of power by means of fluid under pressure is well known, and this may be accomplished by means of a pump and a motor, the capacity of one or both being variable, the fluid being circulated from one to the other whereby the ratio can be varied by varying the relative capacities. Such a system involves considerable difficulty, particularly as regards the variation in capacity and in the provision of adequate bearings, owing to the relatively large power transmission in relation to the permissible size of the equipment. Control systems for such apparatus are necessarily complicated if it is desired that variations will occur automatically and in accordance with the speed and load, and the requirements of the operator.

Free piston internal combustion engines are now well known, and these engines eliminate the crank shaft and connecting rods, and usually comprise pistons working in a cylinder, which may be associated with further pistons and cylinders arranged to compress and deliver air, so that the engine will deliver its power in the form of compressed air, which may be led to a turbine, the pistons merely oscillating backwards and forwards in the cylinder.

According to the preferred form of the present invention an internal combustion engine with associated transmission apparatus comprises engine pistons operating in cylinders, at least one piston and cylinder to serve as a hydraulic pump, said pistons being connected together; a movable part associated with the pump piston, so that pressure developed by forces from the engine pistons acts on both the pump piston and said movable part, causing the movable part to be displaced to a more or less degree, dependent on the speed of the pistons and/or the load, whereby the pressure and delivery of the hydraulic pump is automatically varied. The pump piston and/or movable part may be associated with a manual control whereby the effect may be varied at will. The displacement of the movable part may be varied by reason of its mass, or alternatively it may be resiliently mounted so that more or less force will produce more or less displacement. The hydraulic pressure may actuate a hydraulic motor or other mechanism.

Constructional forms of the invention will now be described by way of example with reference to the accompanying diagrammatic drawing FIGURES 1 and 2 which are sectional views of two forms of apparatus made in accordance with the invention.

Referring first to FIGURE 1:

Pistons 10A, 10B operate in cylinders 11A, 11B, carried by a housing 9 and are connected together by a rod 12. The rod 12 carries a piston 13 disposed between the cylinders 11A, 11B and which operates in a bore 14A, 14B in a movable part 15. The movable part 15 is in form of a piston and works in a cylinder 14A, 14B in the housing 9. The part 15 has a portion with an increased diameter 17 which serves as a piston and operates in a cylinder 18 which is an enlarged part of the cylinder 14A, 14B. An air inlet duct 19 communicates with spaces 19A, 19B in the engine cylinders 11A, 11B, and inlet and exhaust ports 45, 46 are provided. There are fuel injectors 47A and 47B and the engine operates in well known manner. Air is drawn through port 45 to space 19A and transferred to space 48A where it is compressed. Fuel injected is burnt. Exhaust gases leaving by port 46. Valves 21A and 21B comprise part of the hydraulic pump and are provided in inlet ducts 20A, 20B connected with a common inlet 120. The valves are urged towards their inlet duct closing positions by springs 29A, 29B. The inlet ducts 20A, 20B communicate via the valves 21A, 21B, and by ducts 16A, 16B, with pump delivery ducts 22A, 22B. Valves 23A, 23B are provided in the pump delivery ducts 22A, 22B, and are urged towards their closing positions by a common spring 24. The ducts 22A, 22B are connected with a common outlet duct 25 and a duct 30 connects the duct 25 with the inlet duct 120 and is provided with a valve 31 normally held open by a spring 26 and connected to the throttle pedal 135 of a vehicle or to some other convenient manual control. Valve 31 may be controlled by a governor or other speed sensitive device. The delivery duct 25 and the return duct 42 leading to inlet 120 may be opened to one or more hydraulic motors 32 by means of spaces 27A, 27B and conduits 28, 29. A valve rod 33 carries three piston valve parts 33A, 33B, 33C which can either close the delivery duct 25 to the conduits 28, 29 or connect delivery duct 25 to either of the conduits 28, 29 so as to change the direction of delivery and return to and from the hydraulic motors 32. A valve rod 34 carries piston valve parts 34A, 34B, 34C, 34D which engage in a bore 35 with which the conduits 28, 29 communicate.

A spring 36 urges the rod 34 in the direction to open the conduits 28, 29. The rod 34 is connected by links 38, 39 to a pedal 40 whereby the rod 34 can be moved to close the conduits 28, 29. Exhaust 50 allows escape of any leakage. In the position shown the spaces 27A, 27B communicate with two ducts 40, 41 which are connected by a duct 42 to the inlet 120. The motors 32 therefore are opened to inlet 120. If valve rod 33 is moved to the right then 25 is connected to 28 and 29 is connected to 120. If valve rod 33 is moved to the left then delivery duct 25 is connected to 29 and 28 is connected to inlet 120.

In operation, the pistons 10A, 10B in the cylinders 11A, 11B comprise an engine operated on a 2 cycle system, air being drawn in in the usual manner in the spaces 19A, 19B and transferred to the other side of the pistons where it is compressed so that fuel either carried with the air or injected can be burnt. The piston 13 oscillates backwards and forwards and if it were not for the movable part 15 would draw liquid through the ducts 20A, 20B and valves 21A, 21B and discharge it through the ducts 22A, 22B and valves 23A, 23B in accordance with the actual displacement caused by movement of the piston. Any liquid pressure in the spaces 14A, 14B of cylinder 14 will, however, act on and tend to move the part 15, thereby reducing the volume of liquid discharged by the piston 13 through delivery duct 25. If pressure in the ducts 22A, 22B is sufficiently high, e.g., if the valves 31, 33, should be closed, the movement of the part 15 will be such that its displacement is equal to that of the piston 13 and hence no liquid is discharged. The lower the pressure in the ducts 22A, 22B, the less will be the movement of the part 15 and the greater the discharge. The increased diameter 17 of part 15 forms a piston in the cylinder 18, that is constructed so as to be air tight and movement of the part 15 will therefore compress the air in the spaces 18A, 18B of the cylinder 18. If the part 15 were of no mass then movement of the piston 13 in the one direction would cause movement of the part 15 in the other direction, hence if the valve 31 is closed and the valve 33 opened the greater the resistance on the hydraulic motors 32, the greater the movement of the part 15 and the greater the hydraulic pressure in the ducts 22A, 22B, and the greater the air pressure developed in the spaces 18A and 18B. As the resistance on the motor or motors 32 is varied so will the displacement of the part 15 and the hydraulic pressure in ducts 22A, 22B and the air pressure in the cylinder spaces 18A, 18B. The liquid delivered through the ducts 22A, 22B will vary in accordance with the resistance on the motor or motors 32. Part 15 however will have mass and this will cause the amplitude of the movement of the part 15 to be varied in accordance with the speed or frequency of displacement of the piston 13, i.e., speed of the engine. The phasing of the movements of the part 15 and the piston 13 can be varied by the mass of the part 15 and the air pressure in the cylinder 18, this will also be affected by the speed of the engine. The forces acting in the cylinders of the engine can be at least in part counter balanced by the hydraulic pressure acting on the ends of the hydraulic cylinder and the air pressure acting on the ends of the air cylinder spaces 18A, 18B. The movements and pressures will be affected by the areas of the ends of the part 15 hence hydraulic pressure and delivery under various conditions of load and speed and the general working conditions of the engine can be affected by the proportions of the part 15.

If the part 33B of valve 33 is shut or the valve 31 opened, the engine may run without building up pressure in the hydraulic motor. Assuming the valve part 33B is opened then as the control 135 is moved and the valve 31 closed, the pressure will be built up thereby causing the motor 32 to be driven. The valve rod 33 for forward or reverse drive can be moved into either of two positions thereby changing direction of the flow to the hydraulic motor. For braking purposes the valving parts of valve rod 34 may be partly closed or held shut if it is desired to lock the motor.

Figure 2:
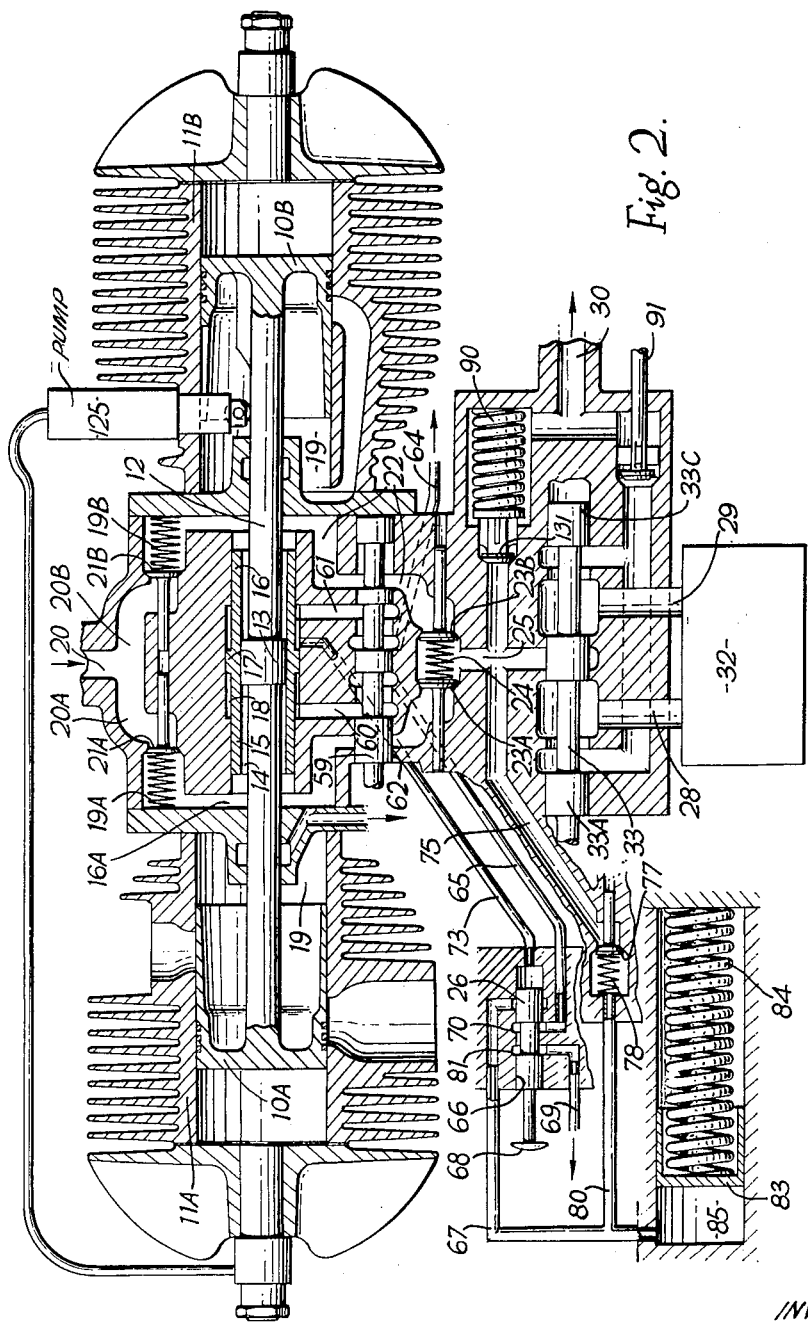

In FIGURE 2 other features are shown which may be used separately or combined with the arrangement shown in FIGURE 1. In FIGURE 2 the cylinder 18 is connected by channels 60, 61 to a bore 62 controlled by a piston valve 59 for the purpose of opening at will the hydraulic pressure to the increased area provided by cylinder 18.

The bore 62 is connected by a channel 64 to a reservoir for exhaust of leakage and by a channel 65 to a port 70 in a valve bore 66 containing a piston 26 for starting the engine, controllable by a hand control 68 and having a connection 67 to the hydraulic pressure accumulator cylinder 85 having piston 83 and spring 84. Movement of 68 opens pressure to 65 causing the part 15 and engine pistons to move to the end of the stroke. Duct 69 provides return to the reservoir. The cylinder 18 also has a connecting duct 73 to one end of the bore 66 so that on completion of the stroke valve 26 will close.

The delivery duct 25 is connected by channel 75 through the valve 77 closed by a spring 78 to a channel 80 which leads to the cylinder 85 so as to replenish the accumulator.

The cylinder 18 in FIGURE 2 contains liquid, instead of air as shown in FIGURE 1, which may be connected to an air chamber or cylinder having a spring loaded piston. The part 15 may be of such mass as to provide the variation in delivery with speed of the engine. A valve 91 is shown to allow escape of liquid from the hydraulic motor 32 should the pressure become excessive. This can also be used for braking. A valve 31 with spring 90 will allow escape of liquid so as to prevent the engine racing when, for example, operating with the valve 33 shut. An arrangement of the part 15 as in FIGURE 2, i.e., with piston 17 of small displacement, may be used as a means of varying the hydraulic area of the part 15.

When the area is increased the hydraulic delivery is decreased for a given engine speed or hydraulic motor resistance, and the effect of an increased ratio can be provided at will for acceleration or hill climbing in the case of a vehicle. The arrangement shown in FIGURE 1 can be extended in length so that both an air cylinder 18, FIGURE 1, and the hydraulic cylinder 18, FIGURE 2, can be incorporated. Alternatively the air cylinder 18 may be variable, e.g. increased compression space may be provided by opening valves to spaces connected to 18A and 18B so that a given movement will develop less pressure. For starting the engine, air under pressure may be opened to the cylinder 18, FIGURE 1 in known manner for starting free piston engines or hydraulic pressure from a reservoir may be utilised, as already described.

In applying the invention, e.g., to a vehicle, the motor 32 is connected to the wheels of the vehicle. If the engine is running slowly, i.e., pistons 10A, 10B oscillating slowly, the delivery of fluid to the ducts 22A, 22B will be small, and if the resistance provided by the wheels is high enough the pressure in the fluid motor will be insufficient to actuate the motor, and in these circumstances the vehicle will remain stationary. If the engine is caused to run faster, greater pressure will be produced in the ducts 22A, 22B, owing to the greater forces required to oscillate the part 15, or if greater loads are introduced by, for example, greater air pressure on the movable part, the fluid motor will be caused to rotate thereby driving the vehicle. Desire for further increases in speed, or reduction in load will result in a greater volume of fluid to being delivered to the ducts 22A, 22B, and to the motor, and since this is equivalent to a closer ratio, the vehicle is driven faster. One purpose of the increased diameter 17, is to provide an over-riding variable effect which may be controlled by the operator, thereby causing increased or decreased movement of the part 15, and giving the effect of a wider or closer ratio. Hence when fitted to a vehicle, if the operator wishes to accelerate more rapidly or to climb a gradient, the throttle control may be connected for example to valve 59 and when moved fully, will cause the engine to run faster in relation to the speed of the vehicle, thereby providing greater power and torque to the wheels.

It will be understood that the form of the invention is illustrated merely by way of example and various modifications are possible. For example the rod 12 may carry a beam, the piston 13 being mounted thereon, and a mass attached to the end of the beam whereby oscillation of the rod 12 may oscillate the mass, the stroke of the piston being variable according to speed and load.

The engine may be constructed according to well known principles, and may have "bounce" chambers and fuel may be injected at the appropriate time by means of a pump such as 125. Fuel may be drawn in with the air. The pistons 10A, 10B may have two diameters, so that the volume of air drawn into the space 19 is increased.

The hydraulic system may also be arranged on known lines, the ducts 20A, 20B, 22A, 22B, leading to the fluid motor may be reversed by any means to provide reversed drive and one or both may be closed for neutral. The duct leading from the fluid motor may be provided with a valve for braking purposes, and may be used to stop the vehicle or to provide only partial braking. Several fluid motors may be used, and a valve provided for disengaging or locking one or more out of action. A hydraulic accumulator or reservoir under low pressure may be provided to maintain the system full of liquid. Build up of pressure in the accumulator may be used to govern the speed of the engine.

If desired the movable member 15 may be omitted and the pumped liquid may directly compress the air in the chambers 18A and 18B. Also if desired the pistons 10A and 10B may be arranged to move in opposite directions in known manner.

I claim:

1. In or for an internal combustion engine and transmission apparatus comprising free pistons operating in cylinders, the provision of at least one pump having a pump piston connected to said free pistons and operating in a pump cylinder, the free pistons and their cylinders being arranged in one or more opposed pairs, the pump piston being connected to both the free pistons, means for introducing fluid into the pump cylinder, said means including inlet valves, outlets for the fluid from said pump cylinder, said outlets including outlet valves, at least one movable part constituting an inertia member acted upon by the pressure developed by movement of said pump piston causing liquid to be displaced first at one end of the pump inertia member and then at the other end of the pump inertia member, the inertia member being so connected with the pump that variation in the position of the inertia member varies the output of the pump and output driving means actuated by the pump output; said inertia member being variably positioned depending on the pressure built up by the pump in the outlets which is dependent on the load on the output driving means, and on the speed of the pump piston and on the mass of the inertia member, whereby liquid can flow through the outlets to a variable extent and correspondingly displace said inertia member so that delivery through the outlets will be dependent on the load on the output driving means and on the speed of operation of the pump piston and on the mass of said inertia member.

2. Apparatus as claimed in claim 1 having means whereby resilient pressure acts on the inertia member to resist movement thereof.

3. Apparatus as claimed in claim 1 wherein the resilient pressure is provided by means including a piston on the inertia member operating in a fluid cylinder.

4. Apparatus as claimed in claim 1 wherein the movable part includes a cylinder containing the pump piston.

5. Apparatus as claimed in claim 1 wherein the pump and movable part are located between the free pistons on a common axis.

6. Apparatus as claimed in claim 1 having a hydraulic motor constituting an output driving means and wherein the outlets are connected to a common channel controlled by a valve device serving to close and open delivery and direct it selectively to the ducts leading to and from the hydraulic motor.

7. Apparatus as claimed in claim 1 having an air cylinder, and an additional piston working in said cylinder and connected to said movable part so that air pressure will be built up to a degree depending on the displacement of said movable member.

8. Apparatus as claimed in claim 2 in which the movable part comprises a piston operating in a bore and also has an internal bore to receive the pump piston so that pressure produced by movement of the pump piston acts on the ends of the movable member.

9. Apparatus as claimed in claim 2 wherein the movable part comprises a cylindrical sleeve and a disc carried by the sleeve forms a further piston, the pump piston acts within the sleeve, the sleeve acting in the pump cylinder and an air cylinder is provided in which the disc acts whereby pressure developed by the pump piston acts on the ends of the sleeve tending to cause displacement of the sleeve and whereby the disc builds up air pressure when displaced in its cylinder.

References Cited in the file of this patent

UNITED STATES PATENTS

| | | |
|---|---|---|
| 2,230,760 | Pateras Pescara | Feb. 4, 1941 |
| 2,391,972 | Hufford et al. | Jan. 1, 1946 |
| 2,564,052 | Chiville | Aug. 14, 1951 |
| 2,863,426 | Summerlin | Dec. 9, 1958 |